United States Patent [19]

Meijer et al.

[11] Patent Number: 4,715,183

[45] Date of Patent: Dec. 29, 1987

[54] DUAL SOURCE EXTERNAL HEATING SYSTEM FOR A HEAT PIPE

[75] Inventors: Roelf J. Meijer; Benjamin Ziph, both of Ann Arbor, Mich.

[73] Assignee: Stirling Thermal Motors, Inc., Ann Arbor, Mich.

[21] Appl. No.: 19,590

[22] Filed: Feb. 27, 1987

[51] Int. Cl.$^4$ ............... F02G 1/055; F03G 7/02
[52] U.S. Cl. ................. 60/524; 60/516; 60/641.14; 126/427; 126/433; 165/104.26
[58] Field of Search .............. 60/516, 524, 641.14; 126/427, 433; 165/104.26

[56] References Cited

U.S. PATENT DOCUMENTS

| | | | |
|---|---|---|---|
| 3,029,596 | 4/1962 | Hanold et al. | 60/524 |
| 3,937,017 | 2/1976 | Beschorner et al. | 60/516 |
| 4,084,376 | 4/1978 | Asselman et al. | 60/524 |
| 4,236,383 | 12/1980 | Selcuk | 60/524 |
| 4,602,614 | 7/1986 | Percival et al. | 126/427 |

FOREIGN PATENT DOCUMENTS 138687 10/1981 Japan ..................... 126/427

*Primary Examiner*—Albert W. Davis, Jr.
*Attorney, Agent, or Firm*—Harness, Dickey & Pierce

[57] ABSTRACT

An external heating system for a heat engine such as a Stirling cycle engine which permits thermal energy to be provided by solar energy or fuel combustion sources. The system employs a complexly shaped heat pipe evaporator section having an enclosed cavity for receiving solar energy and another section forming hollow fins which is exposed to hot combustion gasses. Accordingly, either heat source may be used to evaporate working fluid within the heat pipe which is transferred to the associated heat engine.

3 Claims, 3 Drawing Figures

DUAL SOURCE EXTERNAL HEATING SYSTEM FOR A HEAT PIPE

BACKGROUND AND SUMMARY OF THE INVENTION

This invention relates to a heat exchanger apparatus and particularly to one useful for providing thermal energy via a heat pipe to a heat engine which is capable of being operated by solar energy and/or a combustion heater.

Stirling cycle engines and other heat engines may be powered by heat which is transferred by a heat pipe from external sources. By separating the heating system of the engine from its "thermal convertor", a single heat engine can be used with various external heat sources. In one potential application for such devices, solar energy may be employed to heat the evaporator portion of a heat pipe which transfers the thermal energy to a Stirling engine where it is converted into mechanical power. Since solar energy is inherently intermittent, there is a need to enable alternate sources of energy to power a single Stirling engine.

In accordance with this invention, an external heating system is provided which enables thermal input energy to be provided to a Stirling engine either through the use of collected solar radiant energy and/or heat generated through fossil fuel combustion. This invention employs a heat pipe having an evaporation portion which defines a cavity for absorption of solar energy, and a combustor portion which absorbs heat from combustion of a fossil fuel. Accordingly, either or both of the heat sources can be employed to power the associated heat engine.

Additional benefits and advantages of the present invention will become apparent to those skilled in the art to which this invention relates from the subsequent description of the preferred embodiments and the appended claims taken in conjunction with the accompanying drawings.

DETAILED DESCRIPTION OF THE INVENTION

Figure 1:
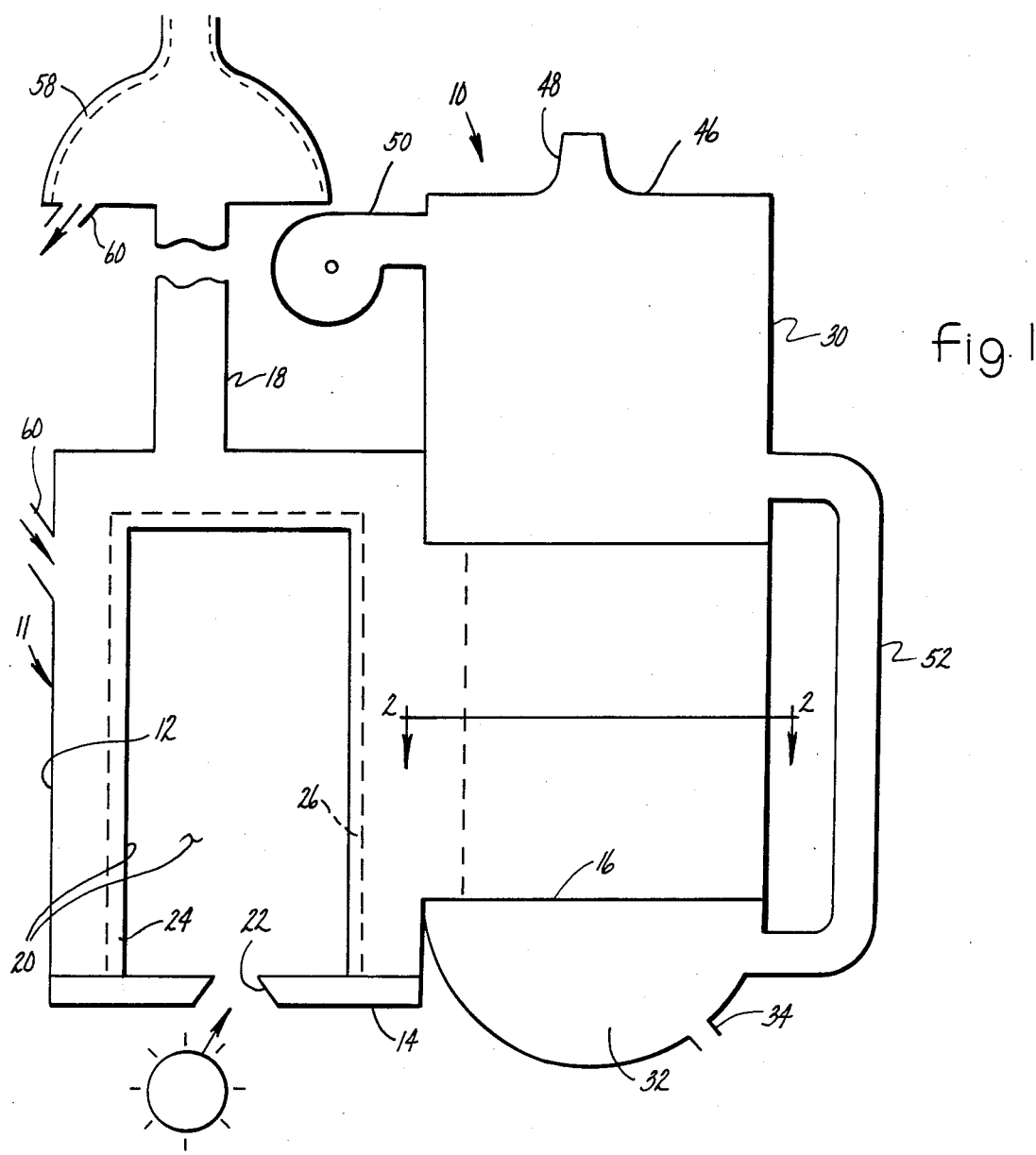
FIG. 1 is a diagrammatic view of the external heating system in accordance with the present invention.

A dual source external heating system in accordance with this invention is illustrated in diagrammatic form in FIG. 1 and is generally designated by reference number 10. System 10 is intended to be used to transfer thermal energy to a heat engine such as a Stirling cycle engine. The transfer of thermal energy occurs through a heat pipe. Generally, heat pipes are comprised of an enclosed vessel having separated evaporator and condensor sections. A heat source supplies thermal energy to the evaporator section which vaporizes a working fluid within the heat pipe. The working fluid vapor having the latent heat of evaporation flows to the heat pipe condensor section where it is condensed, thus giving up its latent heat of evaporation and thus transferring heat from the evaporator to the condensor. The interior cavity of the heat pipe is lined with a wick comprises of a fine, porous material which transports and distributes the working fluid in a liquid state by capillary action.

In accordance with the present invention as shown in FIG. 1, evaporator 12 of heat pipe 11 is configured into two sections: solar energy section 14 and combustor section 16. Heat pipe sections 14 and 16 communicate with transfer tube 18 which is coupled to the heat engine. Solar energy section 14 defines an internal generally closed volume 20 having a relatively small aperture port 22. Focused sunlight is directed through aperture port 22. The inside surface 24 of volume 20 absorbs energy from the solar radiation and heats the working fluid of heat pipe 11, thus causing it to vaporize. Vaporized heat exchange medium is thereafter transferred to the associated heat engine via transfer tube 18. A layer of wick material 26 is shown lining the portion of heat pipe 11 in contact with inside surface 24.

Figure 2:
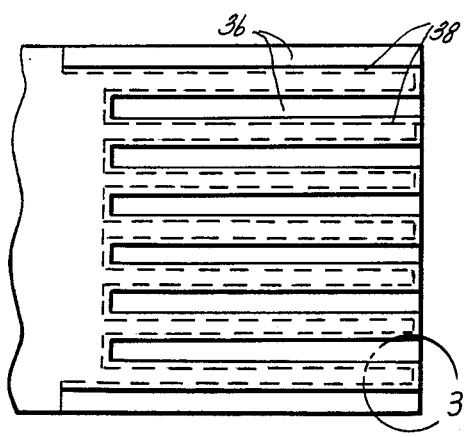
FIG. 2 is a cross-sectional view taken along lines 2—2 of FIG. 1 particularly showing the internal construction of the heat exchanger portion of the system.

Combustor section 16 of heat pipe 11 extends into gas combustor 30. This portion of the heat pipe is substantially identical to that previously described by U.S. Pat. No. 4,523,636, which is assigned to the assignee of this application and which is hereby incorporated by reference. Gas combustor 30 has rigid wall surfaces that define an internal volume. Combustion section 16 of heat pipe 11 defines a number of wick-lined hollow, thin fins 38 within combustor 30, as best shown in FIG. 2. Combustion chamber 32 is disposed in the lower portion of combustor 30. A hydrocarbon fuel flows through fuel nozzle 34 and enters combustion chamber 32 where combustion occurs. Hot gases from combustion flow upwardly along passages 36 formed between the hollow fins 38 of the heat pipe.

Figure 3:
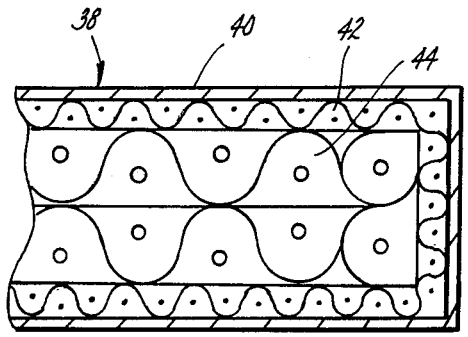
FIG. 3 is an enlarged view of a portion of the heat pipe evaporator shown in FIG. 2.

FIG. 3 provides an enlarged cross-sectional view of a portion of a hollow fin 38 which includes an external housing 40, wick layer 42, and a layer of a relatively incompressible coarse lining 44. Lining 44 preferably has a thickness which is about one-half the empty space within fin 38 between wick layers 42. Lining 44 acts to compress wick layer 42 against the housing 40 surface and further provides enhanced structural integrity since it supports housing 40 against compressive loads imposed when the working fluid therein is at a pressure less than the pressure acting on the outside of fins 38. The internal construction of fins 38 is described in greater detail in the above-mentioned U.S. patent. Working fluid within heat pipe 11, upon vaporization is transported to the associated heat engine via transfer tube 18.

Gas combustor 30 includes a combustion air preheater section 46 having internal fluidly separated gas flow passages. One set of passage is used to conduct combustion gases which exit through exhaust gas stack 48. Blower 50 pumps ambient air through preheater section 46 where its temperature is increased while remaining isolated from the combustion gases. The preheated air flows through duct 52 and exits into combustion chamber 32 where it mixes with the inlet fuel to provide a combustible mixture.

Phase separator 58 is positioned within transfer tube 18 and acts to separate vaporized heat transfer medium which is conducted to the heat engine from condensed heat transfer fluid which is circulated back to evaporator 12 through pipe 60 (shown with its center section broken away).

The external heating system 10 according to this invention permits either solar energy or combustion heat sources to provide thermal energy for a single heat engine such as a Stirling engine. In conditions wherein solar energy is absent, it may be replaced by the combustion heat source. When solar energy becomes available, the combustion process may be ceased or throttled down to provide a desired total thermal energy output.

While the above description constitutes the preferred embodiments of the present invention, it will be appreciated that the invention is susceptible to modification, variation and change without departing from the proper scope and fair meaning of the accompanying claims.

What is claimed is:

1. An external heating system for supplying thermal energy to a heat engine which enables both solar energy and heated gases to be employed as heat sources comprising:
    a heat pipe evaporator cavity,
    a solar energy cavity,
    a heat exchanger section communicating with said solar energy cavity defining a plurality of hollow fins, and
    a gas combustor having a combustion chamber and a housing for directing the heated gasses from said combustion chamber past said hollow fins.

2. The external heating system according to claim 1 wherein said solar energy cavity and said heat exchanger section are directly adjacent.

3. The external heating system according to claim 1 wherein said heat pipe hollow fins are lined with a wick capable of transporting liquid by capillary action and wherein said hollow fins are further lined with a coarse porous material capable of supporting a compressive load thereby increasing the structural stiffness of said fins with the inside width of said hollow fins being twice the thickness of said coarse porous material added to twice the wick thickness, whereby said coarse porous material and said wick fill said inside width of said fin.

* * * * *